O. A. KUBAT.
GLARE SHIELD.
APPLICATION FILED MAY 15, 1915.
1,180,589. Patented Apr. 25, 1916.
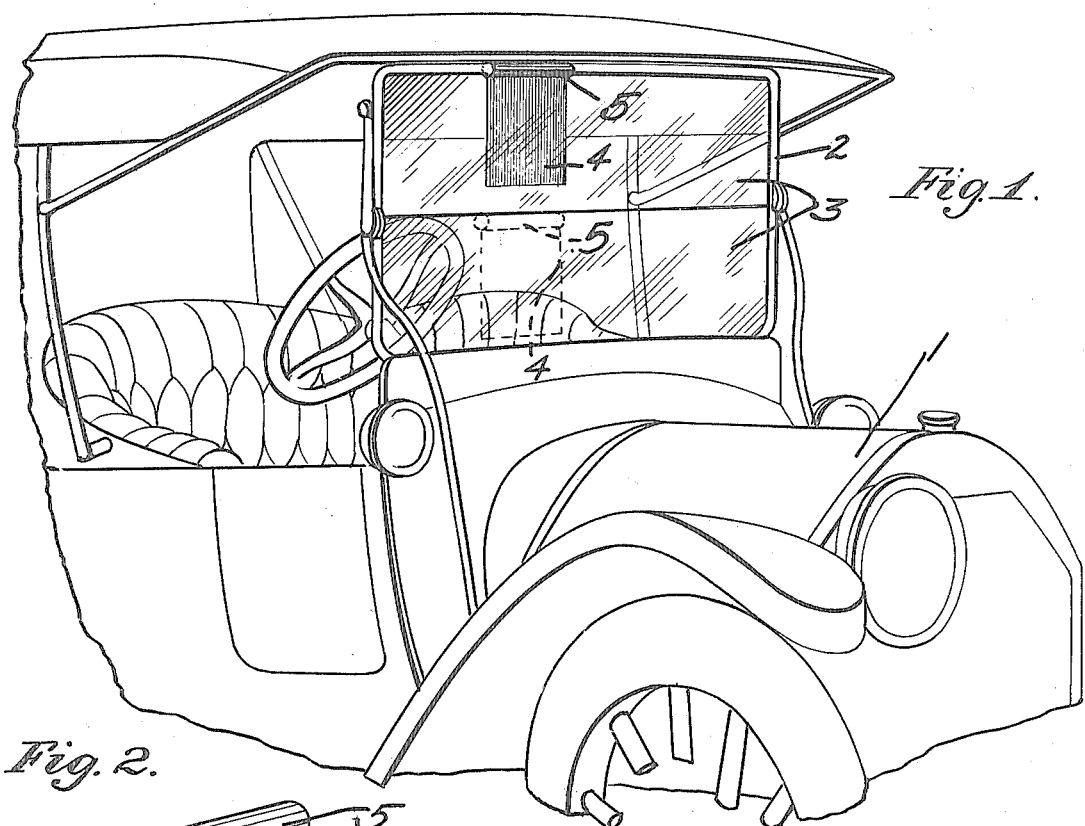
Fig. 1.
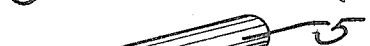
Fig. 2.
Fig. 3.
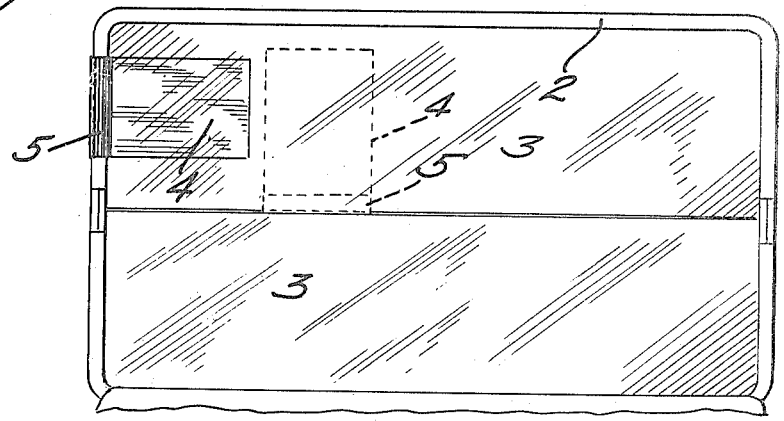
Witnesses
E. C. Skinkle
H. O. Kilgore
Inventor
O. A. Kubat
By his Attorneys
Williamson Merchant

UNITED STATES PATENT OFFICE.

OTTO A. KUBAT, OF OWATONNA, MINNESOTA.

GLARE-SHIELD.

1,180,589.  Specification of Letters Patent.  Patented Apr. 25, 1916.

Application filed May 15, 1915. Serial No. 28,338.

*To all whom it may concern:*

Be it known that I, OTTO A. KUBAT, a citizen of the United States, residing at Owatonna, in the county of Steele and State of Minnesota, have invented certain new and useful Improvements in Glare-Shields; and I do hereby declare the following to be a full, clear, and exact description of the invention, such as will enable others skilled in the art to which it appertains to make and use the same.

My invention has for its object to provide an extremely simple and highly efficient glare shield, especially adapted for use in connection with the wind shield of a motor driven vehicle for dimming the rays of the sun, or of an artificial light, such as the lamps of an approaching vehicle; such rays of light and reflections on the glass of the wind shield being very trying on the eyes of the person driving the machine.

To the above end, generally stated, the invention consists of the novel construction and arranging of parts, hereinafter described and defined in the claim.

In the accompanying drawings, which illustrate the invention, like characters indicate like parts throughout their several views.

Referring to the drawings, Figure 1 is a fragmentary view in perspective of an automobile, equipped with a wind shield, to which is attached the improved glare shield; said glare shield being shown in a different position by means of broken lines; Fig. 2 is a perspective view of the improved glare shield; and Fig. 3 is a view in front elevation of the wind shield removed from the automobile, some parts broken away, and also, showing by means of full and broken lines the improved glare shield in different positions from that shown in Fig. 1.

The numeral 1 indicates, as an entirety, an automobile, having mounted on its dashboard a wind shield comprising a rectangular metal frame 2 hinged at its vertical center and having secured to the upper and lower sections thereof, upper and lower glass panels 3, respectively; said upper panel arranged to fold onto the lower panel in the customary manner. The above described parts may be of the standard, or of any desired construction, and have been illustrated simply for the purpose of showing the invention applied in working position.

The numeral 4 indicates the improved glare shield, which is formed from a single sheet of flexible translucent material, such as celluloid, and of a color that will dim the rays of light and that is restful to the eyes. One edge of the glare shield 4 is rolled to form an open tubular retaining flange 5, adapted to be sprung into interlocking frictional engagement with the frame 2 of the wind shield, or with the adjacent edges of the glass panels 3. As best shown in Fig. 2, the retaining flange 5 is more than a half circle, in cross section, so that the same has to be spread in applying or removing the glare shield to the wind shield. By frictionally clamping the improved glare shield to the wind shield, the same may be very easily shifted, by the driver, into various positions and may also, be very quickly and easily applied to, or removed from, the wind shield. As shown in the drawings, the improved glare shield may be attached to either the vertical or upper horizontal portions of the wind shield frame 2, or to either of the adjacent edges of the glass panels 3, to bring the same into direct line with the eyes of the driver.

The above described glare shield, while extremely simple and of small cost to manufacture, has, in actual usage, proven highly efficient for the purpose had in view.

In the drawings, the glare shield is of oblong form, but it is, of course, understood that the same may take various different forms.

What I claim is:

A glare shield formed from a single piece of flat flexible translucent material, having one of its edges rolled to afford an open tubular retaining flange that is resilient, whereby it may be sprung into position over the frame of a wind shield.

In testimony whereof I affix my signature in presence of two witnesses.

OTTO A. KUBAT.

Witnesses:
  NORMAN EVANS,
  R. J. DEININGER.